N. SULLIVAN.
Nut-Lock.
No. 219,035. Patented Aug. 26, 1879.
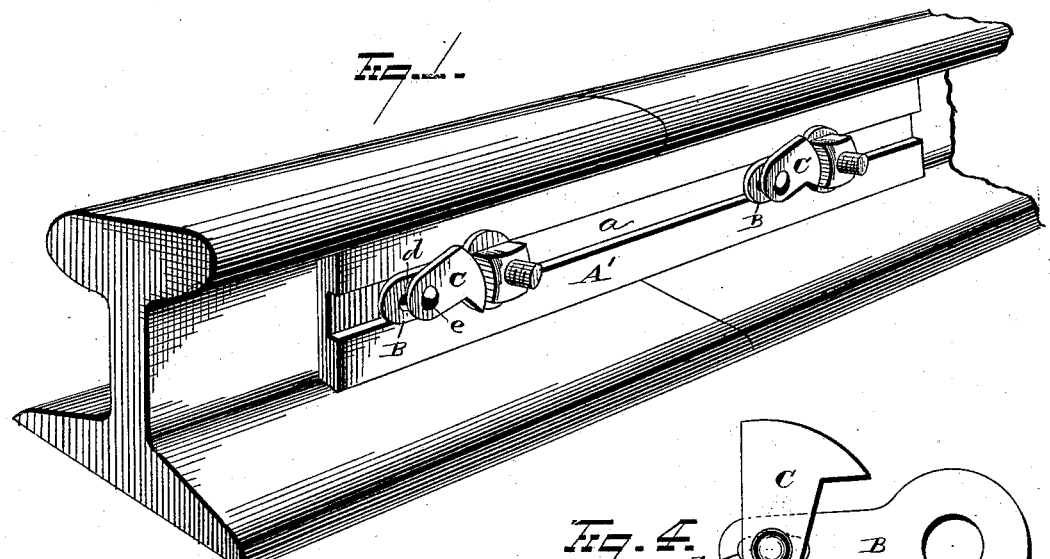
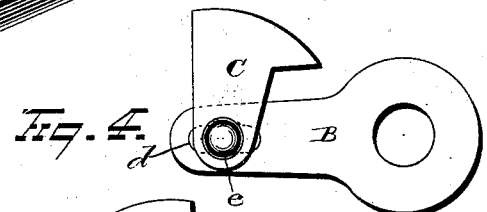
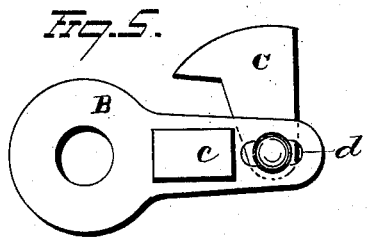
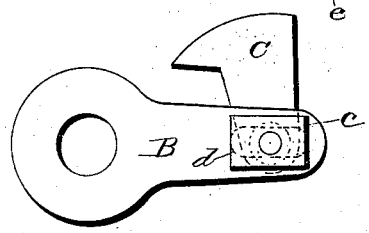
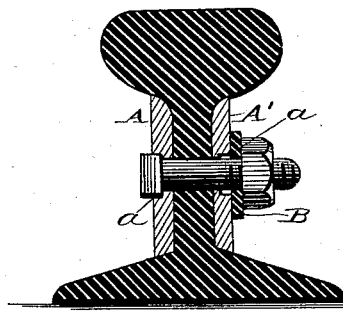
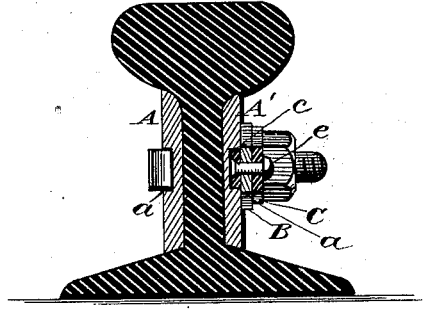
WITNESSES
E. J. Nottingham
A. W. Bright
INVENTOR
N. Sullivan.
By Leggett & Leggett
ATTORNEYS

UNITED STATES PATENT OFFICE.

NICHOLAS SULLIVAN, OF IOWA CITY, ASSIGNOR TO HIMSELF, SAMUEL J. HESS, LOUIS H. JACKSON, AND MOSES BLOOM, OF JOHNSON, IOWA, ONE-FOURTH TO EACH.

IMPROVEMENT IN NUT-LOCKS.

Specification forming part of Letters Patent No. 219,035, dated August 26, 1879; application filed March 28, 1879.

*To all whom it may concern:*

Be it known that I, NICHOLAS SULLIVAN, of Iowa City, in the county of Johnson and State of Iowa, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates more especially to a combined washer and nut-lock, and is designed to provide a device which will be simple in construction, cheap in initial cost, and not liable to get out of order, while at the same time it firmly and durably secures the nut against loosening on its bolt.

The invention consists, first, in the combination of a locking-lever, a washer whose lateral stem is longitudinally slotted, and a bolt or rivet which works in the slot and permits the lever pivoted thereon to be adjusted in parallel line on said stem, so as to lock nuts of different sizes; second, in the combination, with a fish-plate whose outer side is longitudinally grooved, of a washer formed with a lateral stem whose inner side has a projection adapted to fit in the groove, said stem being provided with a locking-lever.

In the drawings, Figure 1 is a view, in side perspective, of my invention applied as in use. Fig. 2 is a transverse section of the same in a line passing through one of the bolts. Fig. 3 is a similar view in a line passing through the projection on the inner side of the stem. Fig. 4 shows the device detached from connecting parts both in front and rear view. Fig. 5 represents a form of washer in which the projection which fits in the groove of the fish-plate is made rigid with said washer.

The fish-plates A A', which fit respectively against opposite sides of the joining rail-sections, are made in duplicate form, each with a longitudinal groove, *a*, on the central portion of its outer side. The heads of the bolts fit into said groove of one of the plates, so as to prevent the bolts from turning, while the projections *b* on the inner side of each of the lateral stems *c* prevent the washers B from having a similar movement. Said washers are formed, as shown, with their lateral stems respectively in the same piece therewith, and to these stems the locking-levers C are pivoted.

The slot *d*, formed in each stem, permits the corresponding lever to be adjusted to and from the free end of the stem, and be properly secured in position by means of a rivet or pivot, *e*, which works in said slot. This adjustment causes the lever to accommodate itself to different sizes or forms of nuts, so as to bring the locking end of the lever in due bearing against the same.

Two forms of providing the washer with the lateral projection on its inner face, which seats into the groove of the fish-plate, are shown in the drawings. One form represents the projection as being freely secured to the plate by means of the pivot or rivet whose opposite extremity secures the lever to said washer. The other form represents the projection as being rigidly secured to the washer and having no connection with said pivot or rivet.

It will be understood without specific statement that certain immaterial changes from the construction of parts shown in the drawings may be made without affecting the invention. For instance, the hole in the washer may be perfectly round instead of oval, or it may be of any form. The bolts may be of any suitable form.

It will be observed that the very simple movement of the lever upon its pivot throws it either into locked or unlocked position.

Having fully described my invention, what I claim as new, and desire to secure by Letters Patent, is—

1. In a nut-lock, the combination of the locking-lever, the washer whose lateral stem is made with a longitudinal slot, and the rivet or bolt which works in the slot, by means of which the lever and washer may be united, substantially as set forth.

2. In a nut-lock, the combination, with a fish-plate whose outer side is longitudinally grooved, of a washer formed with a lateral stem whose inner side is provided, substantially as described, with a head or projection which fits in the groove, said stem being provided with a locking-lever, substantially as set forth.

In testimony that I claim the foregoing I have hereunto set my hand this 18th day of March, 1879.

NICHOLAS SULLIVAN.

Witnesses:
CHAUNCEY A. LOVELACE,
J. B. BUTTLER,
LOUIS H. JACKSON.